United States Patent [19]
Kuan

[11] Patent Number: 5,752,434
[45] Date of Patent: May 19, 1998

[54] FORM SYSTEM FOR TOFU PRODUCTION

[76] Inventor: Feng-Shian Kuan, NO.208, Sec.3, Pa-Te Road, Taipei, Taiwan

[21] Appl. No.: 881,989

[22] Filed: Jun. 25, 1997

[51] Int. Cl.⁶ .................. A23C 3/02; A23J 1/00; A23L 1/20
[52] U.S. Cl. .............. 99/495; 99/453; 99/458; 99/483; 99/496; 100/116; 100/125
[58] Field of Search ............ 99/353–356, 452–460, 99/465, 467, 468, 470–479, 483–485, 495, 496, 509–511, 516, 534–536; 100/115–118, 125; 249/113; 425/84, 405 R; 426/431, 464, 482, 486

[56] References Cited

U.S. PATENT DOCUMENTS

| | | | |
|---|---|---|---|
| 4,534,283 | 8/1985 | Nakamuta | 99/483 X |
| 4,771,681 | 9/1988 | Nagata | 99/453 X |
| 4,813,347 | 3/1989 | Yoshida | 99/516 X |
| 4,869,164 | 9/1989 | Takeyama | 99/353 X |
| 4,920,844 | 5/1990 | Nagata | 99/536 X |
| 4,947,742 | 8/1990 | Nishibayashi | 99/484 X |
| 4,996,916 | 3/1991 | Miyawaki et al. | 99/496 X |
| 5,058,494 | 10/1991 | Hayashi et al. | 99/459 X |
| 5,074,201 | 12/1991 | Takeyama et al. | 99/353 X |
| 5,109,759 | 5/1992 | Asahara | 99/483 X |
| 5,170,697 | 12/1992 | Kuboyama | 99/470 X |
| 5,249,513 | 10/1993 | Ueda | 99/496 X |
| 5,363,753 | 11/1994 | Ueda et al. | 99/459 X |

*Primary Examiner*—Timothy F. Simone
*Attorney, Agent, or Firm*—Pro-Techtor International Services

[57] ABSTRACT

The present invention relates to a form system for tofu production, comprising: a bottom plate; a frame, surrounding the bottom plane; a form grid, further comprising: a border, having a plurality of holes, surrounding an area, which is relatively wide at the top side and relatively narrow at the bottom side, a plurality of V-shaped longitudinal ridges, having two ends connected with the border and open to the bottom side, and a plurality of V-shaped transverse ridges, having two ends connected with the border and open to the bottom side, such that the form grid is divided into a plurality of fields, which are relatively wide at the top side and relatively narrow at the bottom side; a gauze cloth; and a top plate; wherein, for producing tofu, the frame is placed on the bottom plate, the bottom side of the form grid is placed on the bottom plate, the gauze cloth is laid from the top side on the form grid, covering the fields, tofu raw material is poured into the fields, the top plate is laid on the tofu raw material, and pressure is applied on the top plate, such that liquid flows out uniformly from the tofu raw material.

5 Claims, 15 Drawing Sheets

FORM SYSTEM FOR TOFU PRODUCTION

BACKGROUND OF THE INVENTION

1. Field of the Invention

The present invention relates to a form system for the production of tofu, particularly to a form system for fast and hygienic tofu production with little requirements of manpower.

2. Description of Related Art

Tofu is a traditional Chinese food. It is tasty and nutritious, easy to digest and has little calorific content. Traditionally, to produce tofu soya beans are soaked with water, milled, cooked, and the generated liquid is separated from the residue. A binder is added to the liquid, yielding a soft cheese-like tofu raw material. The tofu raw material is wrapped in gauze, and several wrapped packages are stacked on each other, with plates in between. The pressure on the wrapped packages causes liquid to run out. This is further supported by pressing the packages. The thereby congealed substance is the final product. The whole process, however, is complicated and labor-intensive, thus not suited to production on a large scale.

Workers in the production of tofu often have outdated views on hygiene. Since wrapping and pressing of the tofu raw material is done under heat, it is not uncommon that workers use the very cloth for wrapping the tofu raw material to remove sweat.

Wrapping the tofu raw material with the binder under heat also damages the hands of the workers, leading to itching and painful chronical burns. These bad working conditions together with low pay lead to a serious shortage of workers for the production of tofu.

The traditional production of tofu undergoes the following steps (leaving out the stage from soya beans to the tofu raw material):

1. Opening of a gauze cloth.
2. Laying of the tofu raw material onto the cloth.
3. Forming the tofu raw material into the desired form (normally a block) by hand.
4. Wrapping the four corners of the cloth around the tofu raw material, creating a package.
5. Turning the package upside down, maintaining its shape.
6. Squeezing liquid out of the package manually, without opening or deforming the package.
7. Placing the package on a horizontal plate.
8. By repeating the above steps, creating a stack of packages with plates in between up to a certain level, allowing more liquid to be squeezed out by the weight of the packages.
9. Rearranging the stack, such that packages formerly on the top go to the bottom and vice versa and packages formerly exposed to light pressure now undergo heavier pressure for extracting liquid.
10. Placing another horizontal plate on the top of the stack.
11. Pressing the stack by a machine to squeeze out more liquid.
12. Ensuring a certain level of congealedness.
13. Removing the packages one by one from the stack.
14. Unwrapping the packages to get the final products.

This traditional method of tofu production has the following disadvantages:

1. The manual procedure causes hygienic problems.
2. Heat in the process leads to burns on the hands of the workers.
3. Prolonged contact with the binder in the tofu raw material damages the skin.
4. Packages of tofu raw material are dealt with one by one, which is unsuitable for mass production.
5. Workers have to be skilled, but are not easy to train.
6. The shapes of the final products are not uniform.
7. The volumes of the final products differ.
8. Heat in the working place and thereby generated sweat cause bad hygienic conditions.
9. The procedure requires many manual steps.
10. Drops of extracted liquid are different on different sides.
11. Different sizes of the packages of tofu raw material cause varying amounts of liquid to be squeezed out.
12. The plates between the packages of tofu raw material do not allow for the outflow of liquid, hence the skin of the blocks of the final products is not uniform.

SUMMARY OF THE INVENTION

The present invention allows for a production of tofu in the following way:

1. A frame is placed on a bottom plate, and a lower form grid is placed in the frame in a horizontal position.
2. A lower gauze cloth is laid on the lower form grid, uniformly extending beyond the frame.
3. Tofu raw material is poured on the lower gauze cloth.
4. The tofu raw material is covered by an upper gauze cloth.
5. An upper form grid is laid on the upper gauze cloth, and a top plate is laid on the upper form grid.
6. A press is applied.
7. The top plate, the upper form grid, the upper gauze cloth, the frame, the bottom plate, the lower form grid and the lower gauze cloth are removed.
8. The final products are obtained.

The production method using the present invention, as compared to the traditional production method has the following advantages:

1. A single form grid is used, suitable for mass production.
2. Drops of liquid are extracted uniformly, so the surfaces of the final products are uniform, as well.
3. No manual work is necessary, therefore burns are avoided.
4. Various shapes of the final product are possible.
5. No skilled workers are necessary.
6. The final products are of uniform shape.
7. The final products are of uniform size.
8. The produced volume is easy to calculate.
9. The final products are of high strength and of good taste.

The present invention can be more fully understood by reference to the following description and accompanying drawings.

DETAILED DESCRIPTION OF THE PREFERRED EMBODIMENTS

The present invention provides a form system for tofu production, comprising: a bottom plate 1; a frame 2; form grids 3, 7; and a top plate 8. The form grids 3, 7 are the main constituents of the present invention, while the other structural parts provide a typical environment. The form grids 3, 7 are usable separately or as a pair. In the following, the form grids are referred to as a lower form grid 3 and an upper form grid 7.

Figure 1:
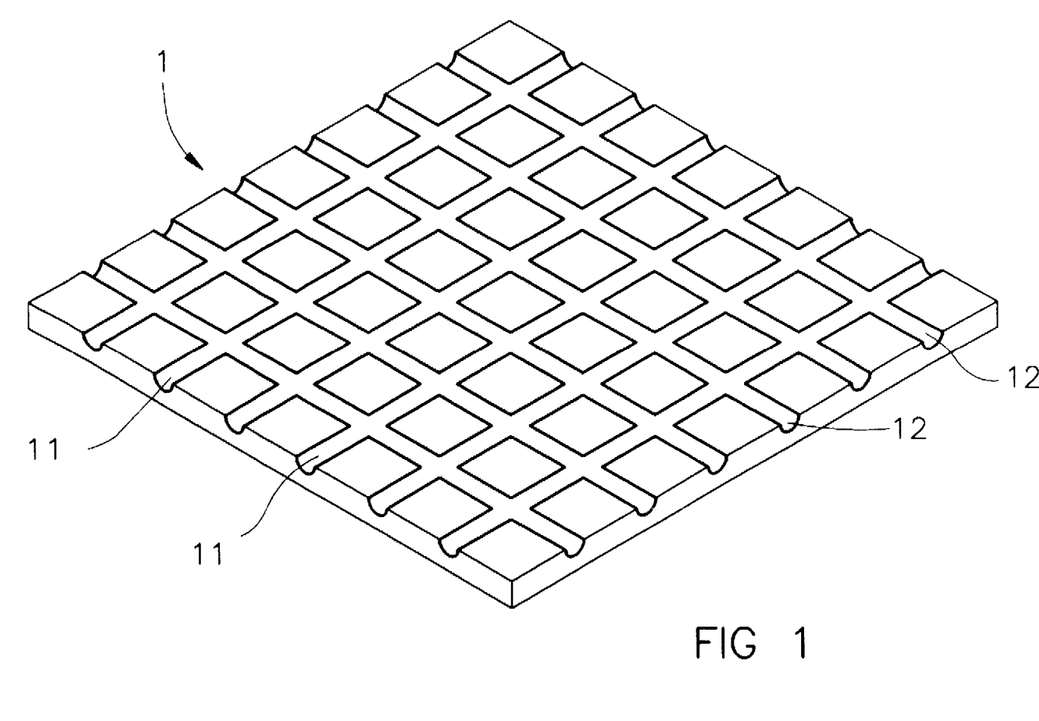
FIG. 1 is a perspective view of the bottom plate of the present invention.

As shown in FIG. 1, the bottom plate 1 is a single body, formed as a grid of longitudinal flow channels 11 and transverse flow channels 12.

Figure 2:
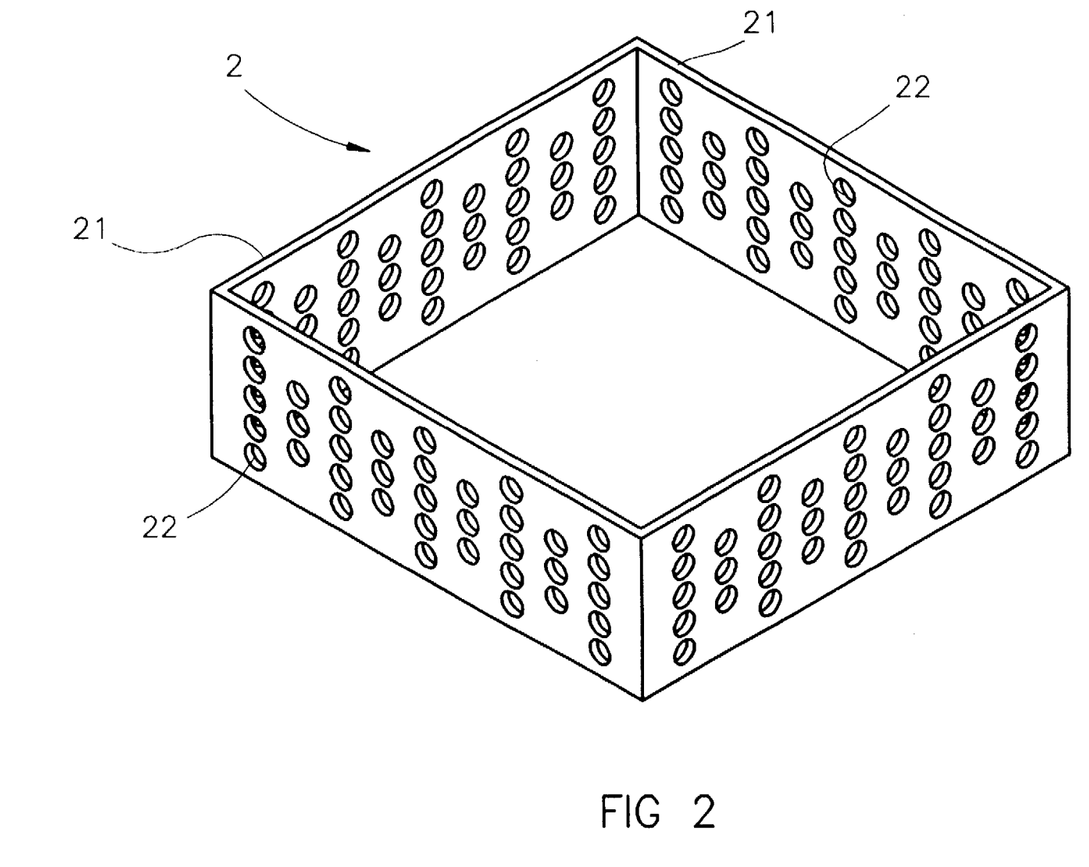
FIG. 2 is a perspective view of the frame of the present invention.
Figure 3:
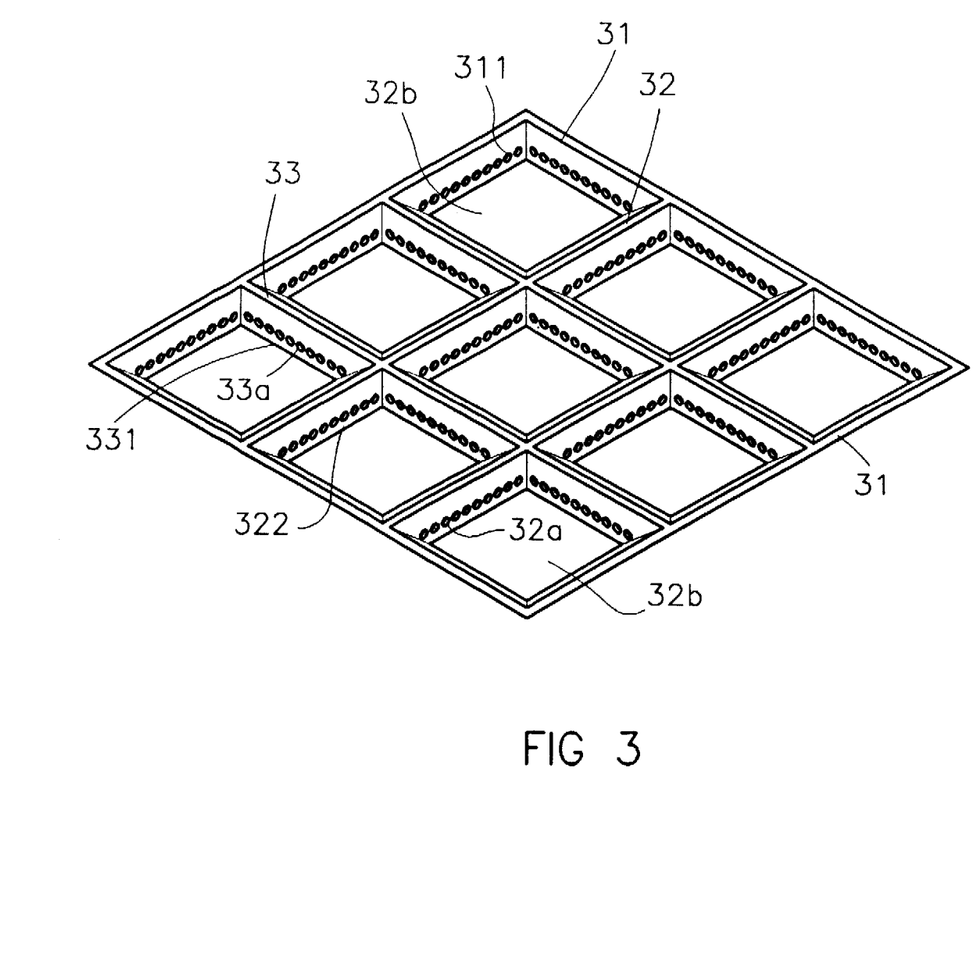
FIG. 3 is a perspective view of the lower form grid of the present invention.
Figure 4:
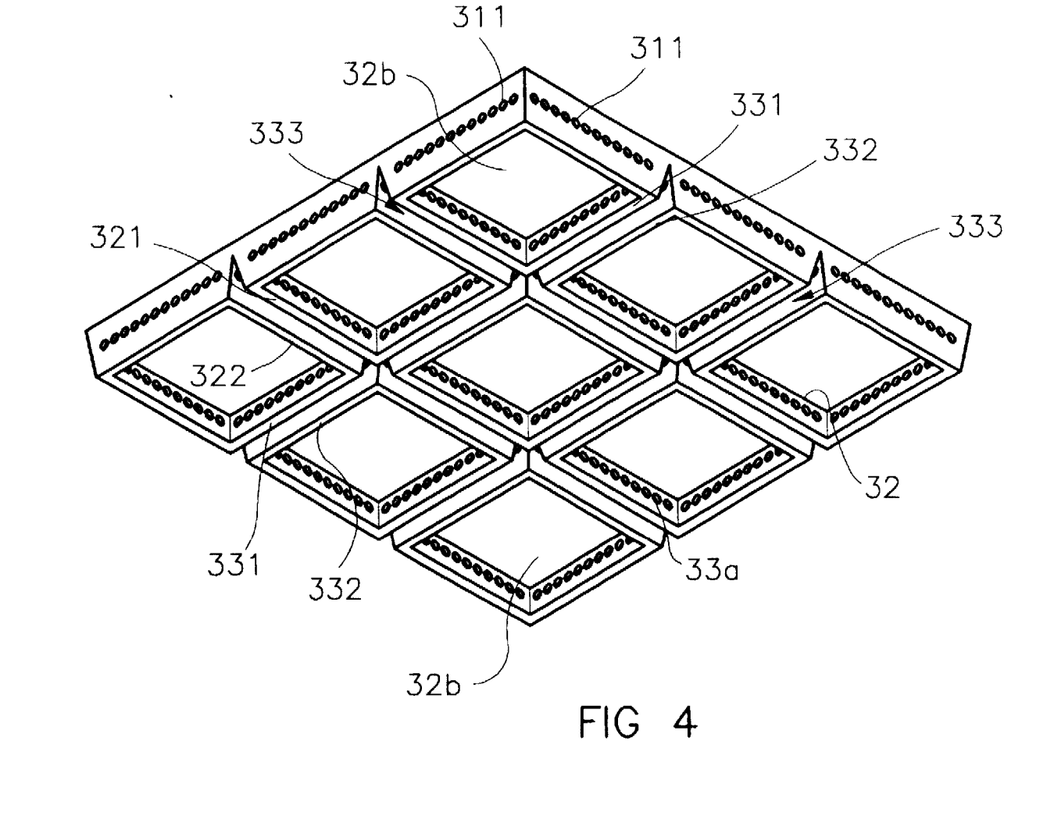
FIG. 4 is a perspective view of the lower form grid of the present invention, taken from below.
Figure 5:
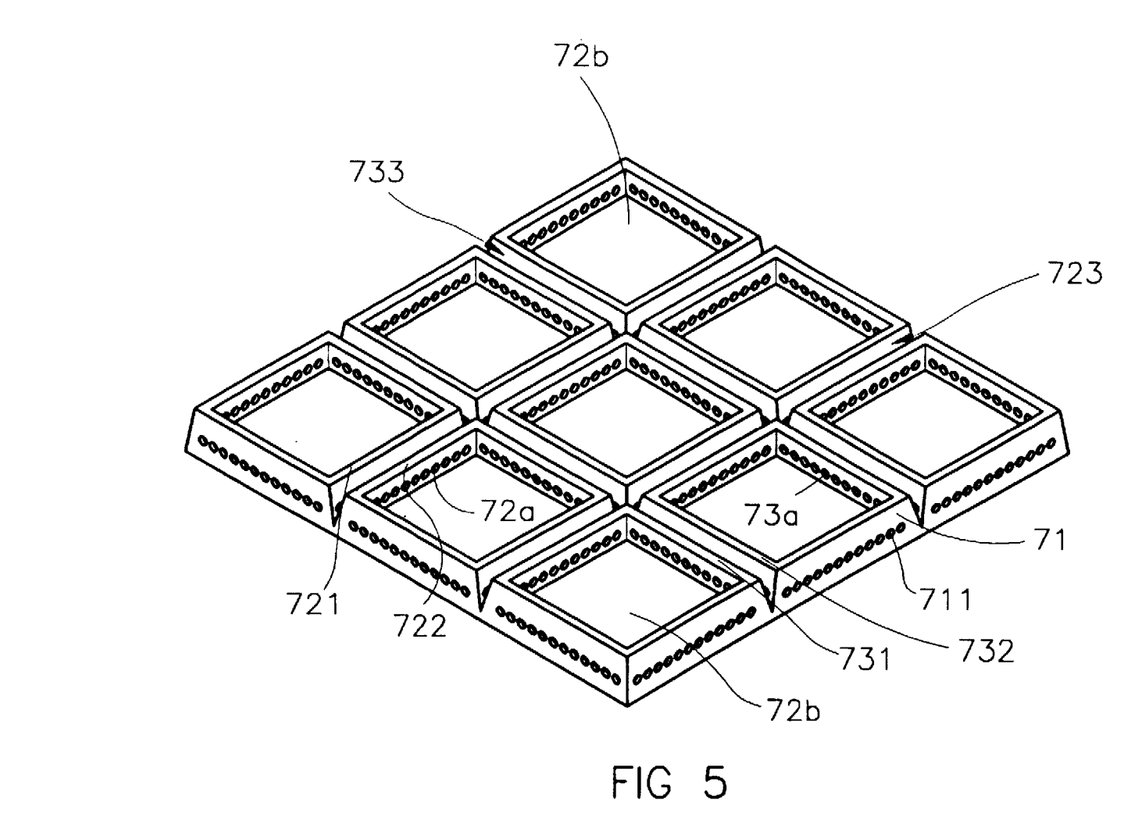
FIG. 5 is a perspective view of the upper form grid of the present invention.
Figure 6:
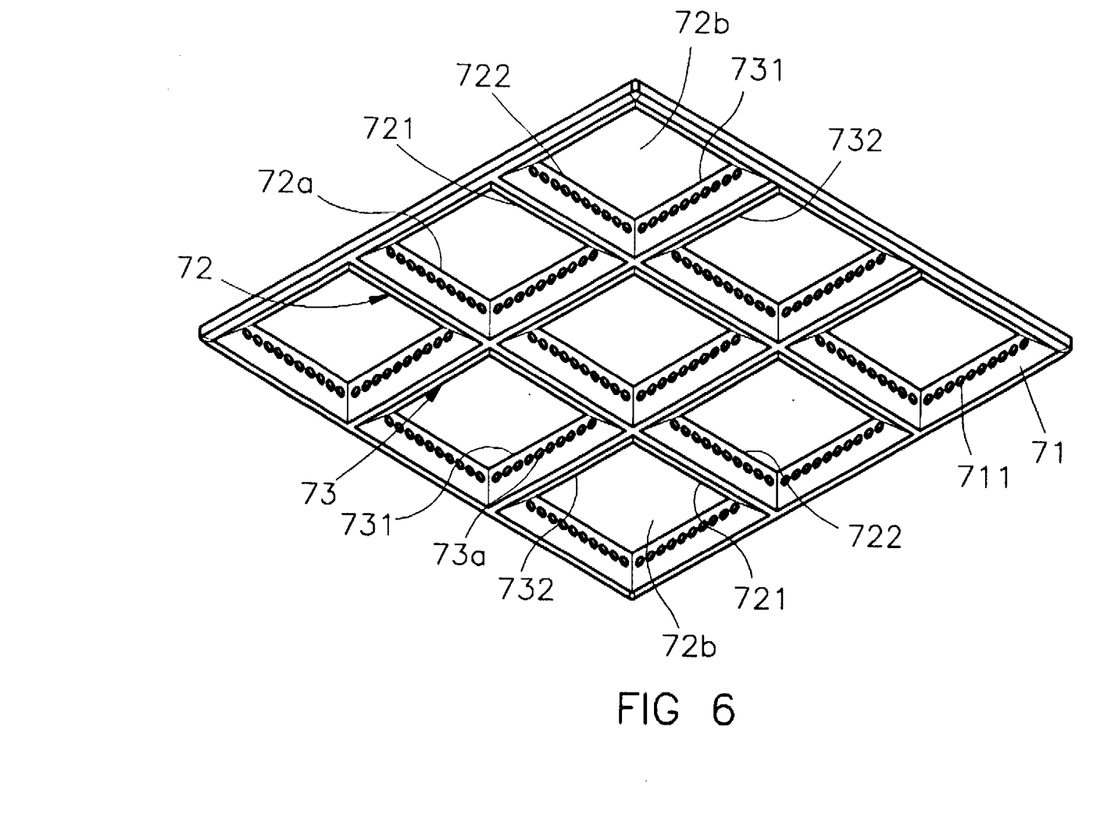
FIG. 6 is a perspective view of the upper form grid of the present invention, taken from below.

Referring to FIG. 2, the frame 2 is placed on the bottom plate 1. It consists of four side plates 21, each of them having many holes 22.

As shown in FIGS. 3-4 and 8-9, the lower form grid 3 comprises a border 31, V-shaped longitudinal ridges 32 and V-shaped transverse ridges 33. The border 31 has four sides of trapezoidal shape, which are relatively wide at the top side and relatively narrow at the bottom side and have many holes 311. Each of the longitudinal ridges 32 consists of a left plate 321 and a right plate 322, which lean against each other, leaving a V-shaped longitudinal groove 323 open to the bottom side in between. The left and right plates 321, 322 have many holes 32a. Each of the transverse ridges 33 consists of a front plate 331 and a rear plate 332, which lean against each other, leaving a V-shaped transverse groove 333 open to the bottom side in between. The front and rear plates 331, 332 have many holes 33a. The ends of the left and right plates 321, 322 as well as of the front and rear plates 331, 332 are connected to the border 31. Thus the lower form grid 3 divides into a plurality of fields 32b, each having four sides of trapezoidal shape, which are relatively wide at the top side and relatively narrow at the bottom side. When tofu raw material 5 is placed in the fields 32b, any liquid extracted is allowed to flow out of the fields 32b through the holes 311 to the outside, through the holes 32a into the longitudinal grooves 323 or through the holes 33a into the transverse grooves 333.

A lower gauze cloth 4 and an upper gauze cloth 6 are used, which are made of fine fabric, in the same way as conventional gauze cloth. The lower gauze cloth 4 is placed on the lower form grid 3, before tofu raw material 5 is placed.

As shown in FIGS. 5-6 and 8-9, the upper form grid 7 comprises a border 71, V-shaped longitudinal ridges 72 and V-shaped transverse ridges 73. The border 71 has four sides of trapezoidal shape, which are relatively wide at the bottom side and relatively narrow at the top side and have many holes 711. Each of the longitudinal ridges 72 consists of a left plate 721 and a right plate 722, which lean against each other, leaving a V-shaped longitudinal groove 723 open to the top side in between. The left and right plates 721, 722 have many holes 72a. Each of the transverse ridges 73 consists of a front plate 731 and a rear plate 732, which lean against each other, leaving a V-shaped transverse groove 733 open to the top side in between. The front and rear plates 731, 732 have many holes 73a. The ends of the left and right plates 721, 722 as well as of the front and rear plates 731, 732 are connected to the border 71. Thus the lower form grid 7 divides into a plurality of fields 72b, each having four sides of trapezoidal shape, which are relatively wide at the bottom side and relatively narrow at the top side. The left and right plates 721, 722 of the longitudinal ridges 72 correspond in their position to the left and right plates 321, 322 of the longitudinal ridges 32. The front and rear plates 731, 732 of the transverse ridges 73 correspond in their position to the front and rear plates 331, 332 of the transverse ridges 32. Thereby, the fields 72b are aligned with the fields 32b. Any liquid extracted from tofu raw material 5 is allowed to flow out of the fields 72b through the holes 711 to the outside, through the holes 72a into the longitudinal grooves 723 or through the holes 73a into the transverse grooves 733.

Figure 7:
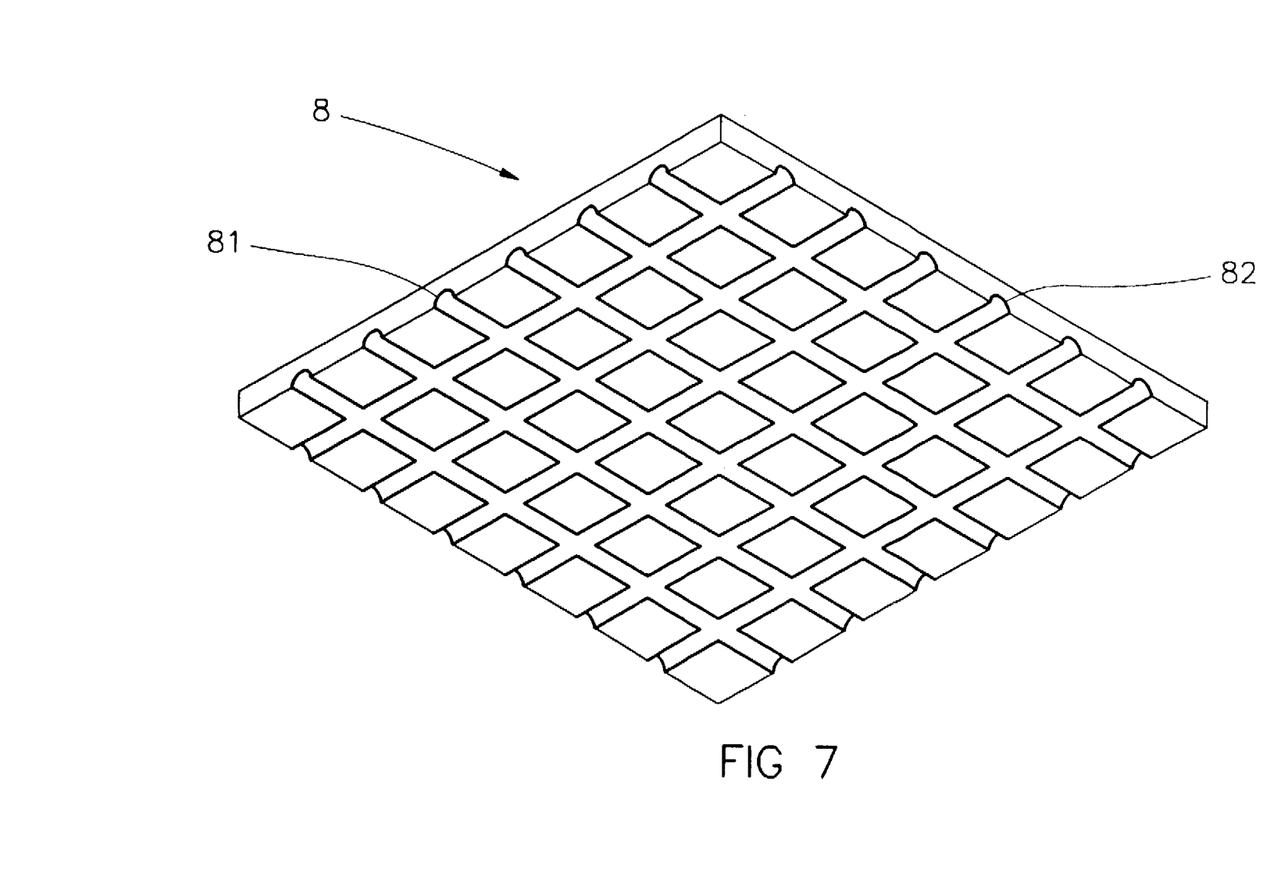
FIG. 7 is a perspective view of the top plate of the present invention.

The top plate 8 is placed on the top side of the upper form grid 7. It is smaller than the frame 2. The top plate 8 is a single body, formed as a grid of longitudinal flow channels 81 and transverse flow channels 82. The longitudinal and transverse flow channels 81, 82 take in liquid extracted from tofu raw material 5. The shape of the top plate 8 is about the same as the shape of the bottom plate 1.

A press 9 is used to apply gradually increasing pressure on the top side of the top plate 8. It is a conventional machine and needs no further explanation.

Using the present invention, tofu and dry tofu are produced in the following way:

1. The frame 2 is placed on the bottom plate 1.
2. The lower form grid 3 is placed in the frame 2 in a horizontal position.
3. The lower gauze cloth 4 is laid on the lower form grid 3, uniformly extending beyond the frame 2.
4. Tofu raw material 5 is poured into the inside of the frame 2, such that the fields 32b are uniformly filled. At this time, liquid starts to flow through the holes 32a in the left and right plates 321, 322 into the longitudinal grooves 323, and through the holes 33a in the front and rear plates 331, 332 into the transverse grooves 333, further seeping through the fabric of the lower gauze cloth 4 and being led away by the longitudinal and transversal flow channels 11, 12. As shown in FIGS. 3-4 and 8-9, the liquid flows out unhindered.

Figure 8:
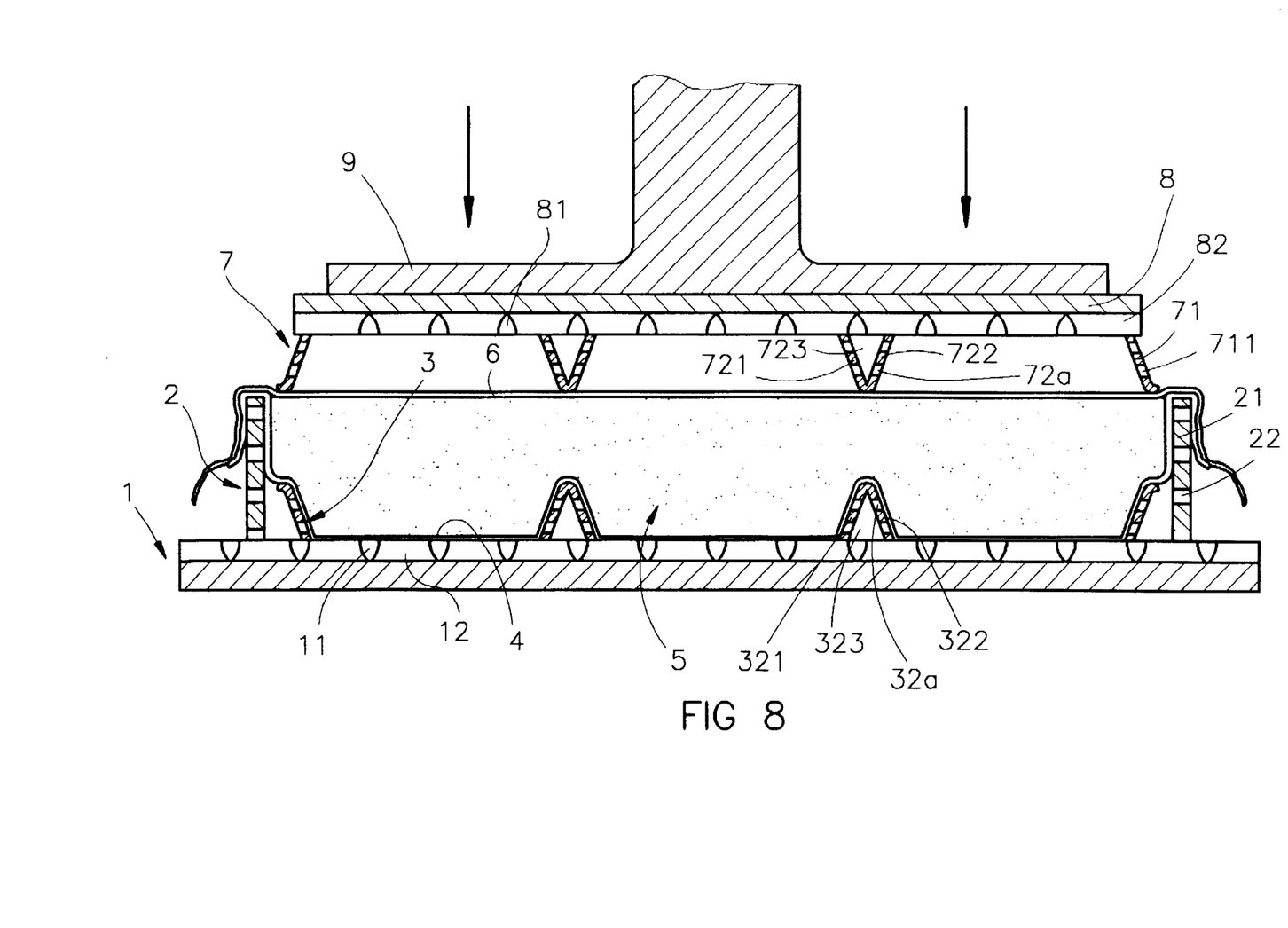
FIG. 8 is a sectional view of the lower form grid and the upper form grid of the present invention, illustrating the positions thereof before pressing tofu raw material.
Figure 9:
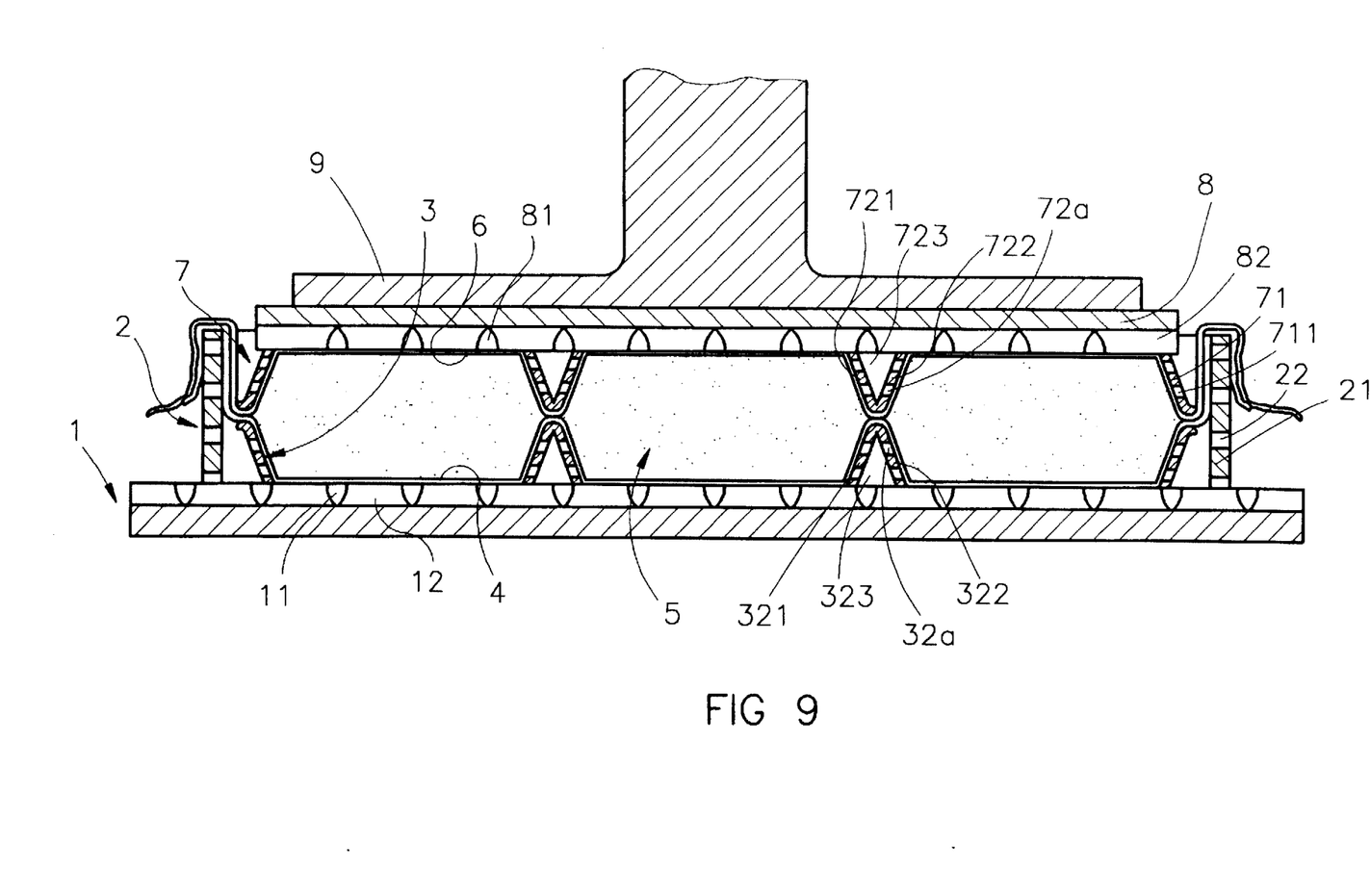
FIG. 9 is a sectional view of the lower form grid and the upper form grid of the present invention, illustrating the positions thereof after pressing tofu raw material.

5. The top surface of the tofu raw material is flattened by a scraper (not shown).
6. The tofu raw material 5 is covered by the upper gauze cloth 6, uniformly extending beyond the frame 2.
7. The upper form grid 7 is laid on the tofu raw material 5 and the upper gauze cloth 6 inside the area of the frame 2.
8. The top plate 8 is laid on the upper form grid 7.
9. The press 9 is applied, as shown in FIGS. 8 and 9. The upper form grid 7 is gradually lowered towards the lower form grid 3, accelerating the extraction of liquid from the tofu raw material 5. Furthermore, liquid starts to flow through the holes 72a in the left and right plates 721, 722 of the upper form grid 7 into the longitudinal grooves 723, and through the holes 73a in the front and rear plates 731, 732 into the transverse grooves 733, further seeping through the fabric of the upper gauze cloth 6 and being led away by the longitudinal and trans-versal flow channels 81, 82. When the upper form grid 7 approaches the lower form grid 3, the tofu raw material 5 in between is cut into pieces. Liquid from the tofu raw material 5 is squeezed out uniformly, so the skin of the tofu pieces generated is uniform, too, and the tofu pieces are of high strength and good taste.

The production of the tofu pieces can also be done without the upper gauze cloth 6. In this case, the border area of the lower gauze cloth 3 is laid over the tofu raw material 5, after it has been poured and flattened and before the upper form grid 7 is placed.

The lower and upper form grids 3, 7 ensure that the produced tofu pieces are of uniform shape and size. The production is simple, with little manual effort, and therefore suitable for mass production.

Figure 10:
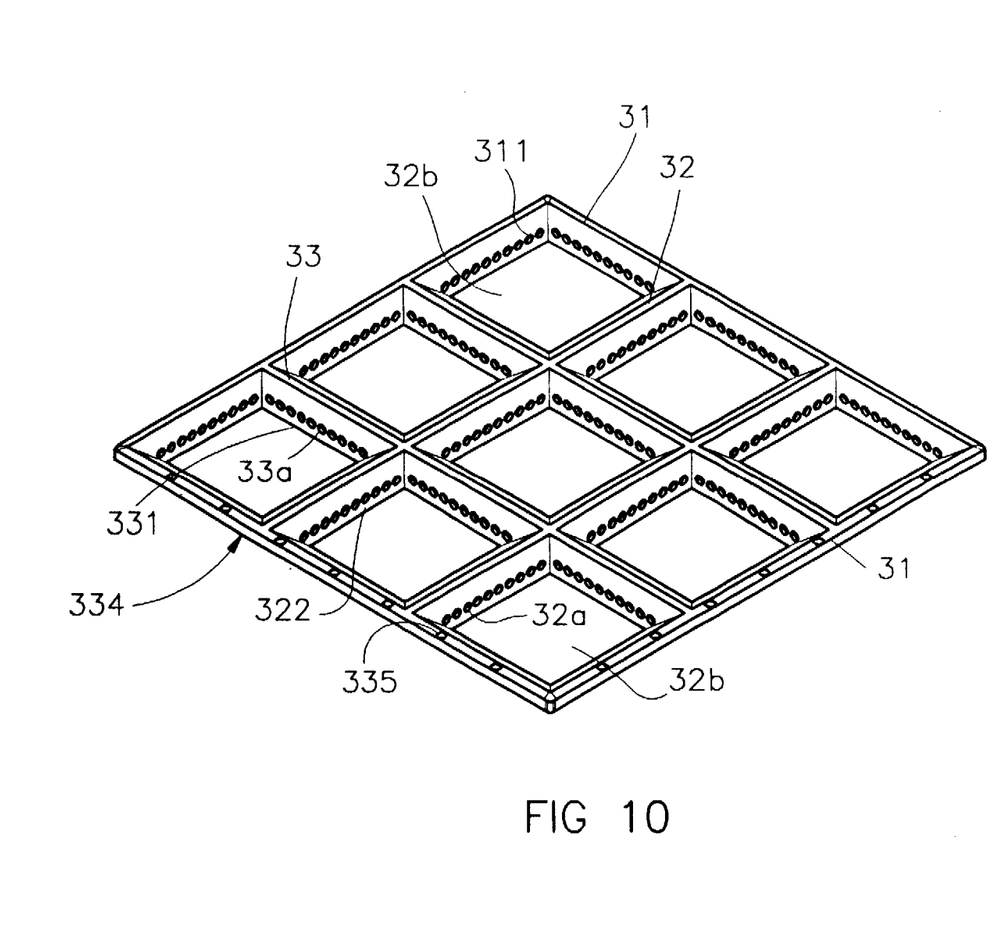
FIG. 10 is a perspective view of the lower form grid of the present invention in a second embodiment.
Figure 11:
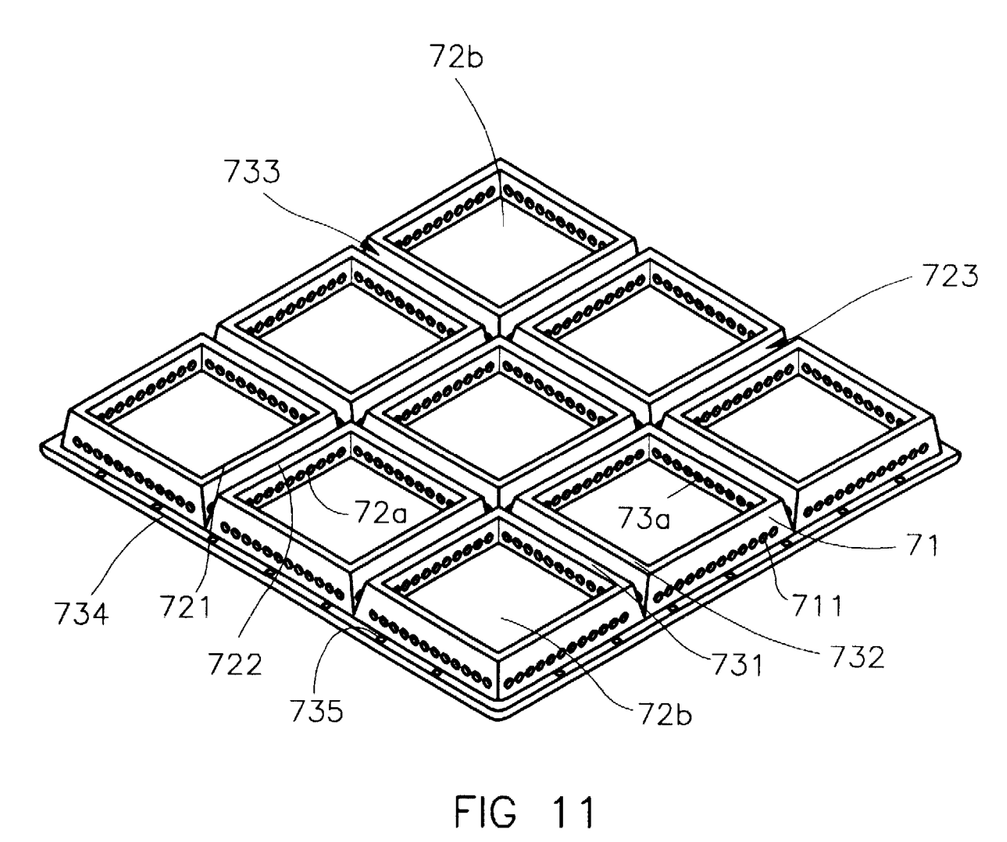
FIG. 11 is a perspective view of the upper form grid of the present invention in a second embodiment.

Referring to FIGS. 10 and 11, the present invention in another embodiment has a lower form grid 3a and an upper form grid 7a. The border 31 of the lower form grid 3 is provided with an additional outward extending flange 734 for strengthening. The flange 734 has many holes 735, allowing liquid to pass through. In the same way, the border 71 of the upper form grid 7 is provided with an additional outward extending flange 734 for strengthening. The flange 734 has many holes 735, allowing liquid to pass through.

As shown in FIGS. 8 and 9, the lower and upper grid plates 3, 7 are usable together. Each of the lower and upper grid plates 3, 7 is also usable alone, as explained below.

Figure 12:
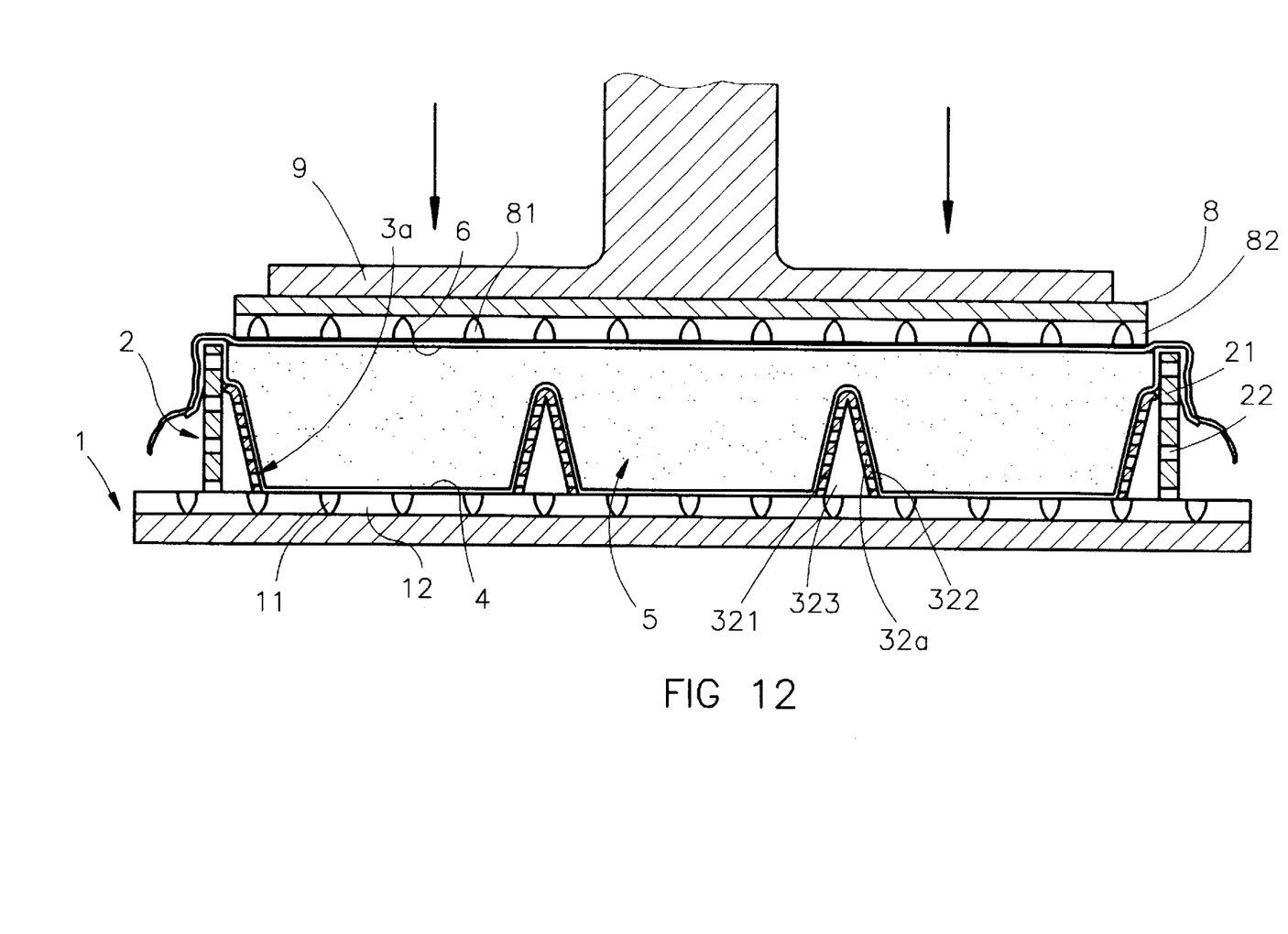
FIG. 12 is a sectional view of the lower form grid of the present invention, illustrating the position thereof before pressing tofu raw material.
Figure 13:
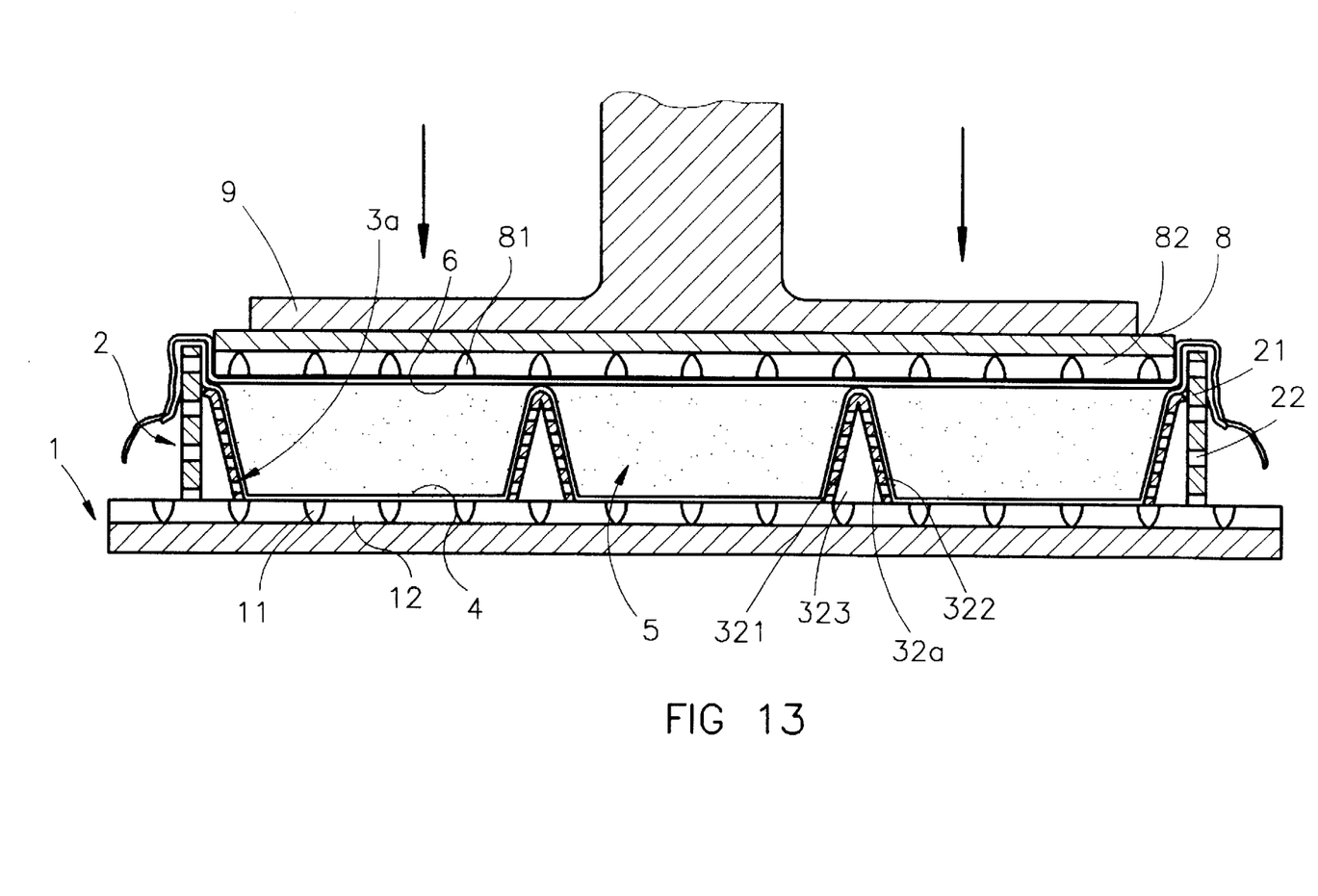
FIG. 13 is a sectional view of the lower form grid of the present invention, illustrating the position thereof after pressing tofu raw material.

Using the lower form grid 3a, tofu is produced in the following way:

1. The frame 2 is placed on the bottom plate 1.
2. The lower form grid 3a is placed in the frame 2 in a horizontal position.
3. The lower gauze cloth 4 is laid on the lower form grid 3, uniformly extending beyond the frame 2.
4. Tofu raw material 5 is poured into the inside of the frame 2.
5. The top surface of the tofu raw material is flattened by a scraper.
6. The tofu raw material 5 is covered by the upper gauze cloth 6, uniformly extending beyond the frame 2.
7. The top plate 8 is laid on the tofu raw material 5 and the upper gauze cloth 6 inside the area of the frame 2.
8. The press 9 is applied.

Figure 14:
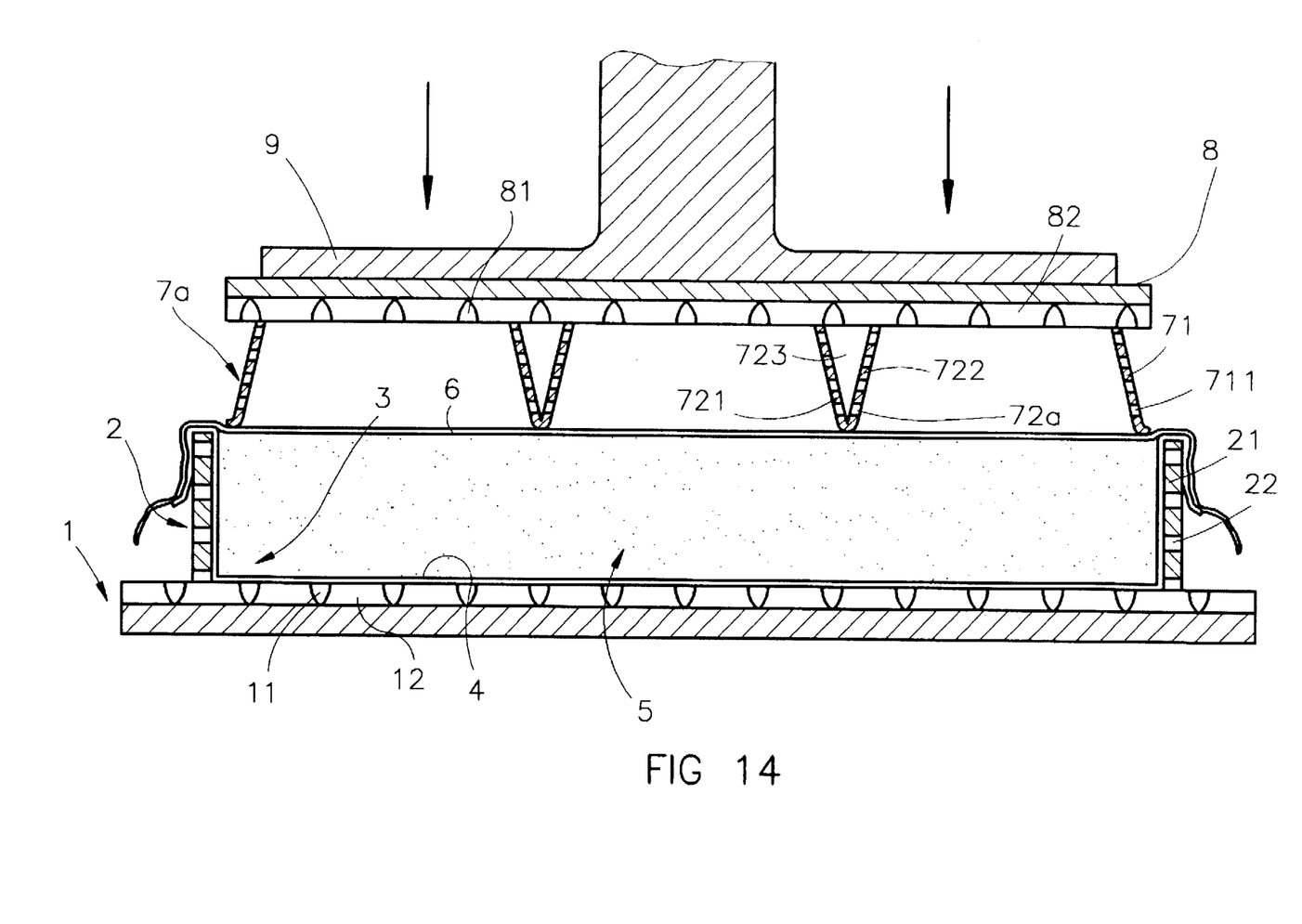
FIG. 14 is a sectional view of the upper form grid of the present invention, illustrating the position thereof before pressing tofu raw material.
Figure 15:
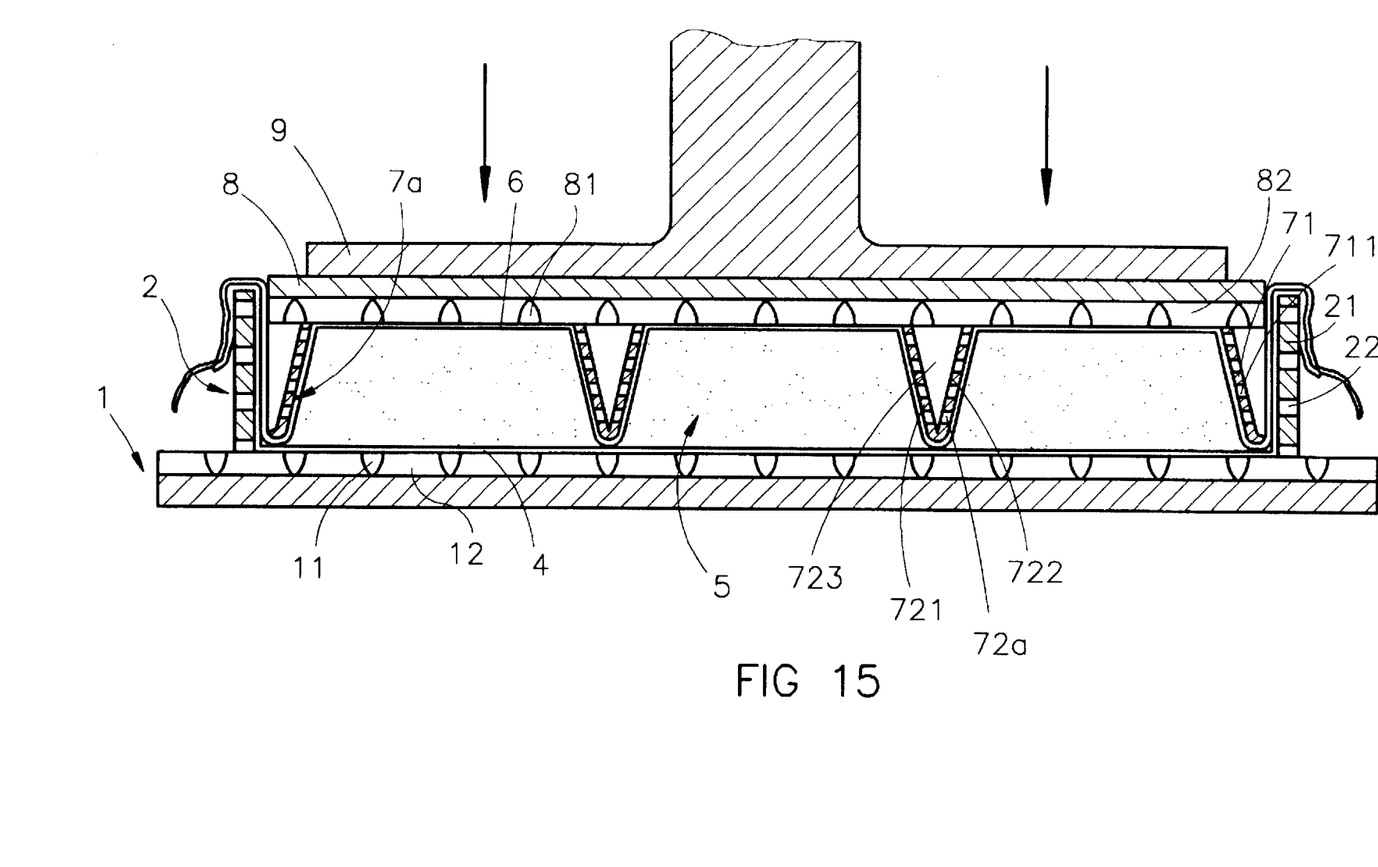
FIG. 15 is a sectional view of the upper form grid of the present invention, illustrating the position thereof after pressing tofu raw material.

Using the upper form grid 7a, tofu is produced in the following way:

1. The frame 2 is placed on the bottom plate 1.
2. The lower gauze cloth 4 is laid on the lower form grid 3, uniformly extending beyond the frame 2.
3. Tofu raw material 5 is poured into the inside of the frame 2.
4. The top surface of the tofu raw material is flattened by a scraper.
5. The tofu raw material 5 is covered by the upper gauze cloth 6, uniformly extending beyond the frame 2.
6. The upper form grid 7a is laid on the tofu raw material 5 and the upper gauze cloth 6 inside the area of the frame 2.
7. The top plate 8 is laid on the upper form grid 7a.
8. The press 9 is applied.

While the invention has been described with reference to preferred embodiments thereof, it is to be understood that modifications or variations may be easily made without departing from the spirit of this invention which is defined by the appended claims.

What is claimed is:

1. A form system for tofu production, comprising:
   a bottom plate;
   a frame, surrounding said bottom plane;
   a form grid with a top side, a bottom side, a longitudinal direction and a transverse direction, further comprising:
   a border, having a plurality of holes, surrounding an area, which is relatively wide at said top side and relatively narrow at said bottom side,
   a plurality of longitudinal ridges, each longitudinal ridge having two ends connected with said border and comprising a left plate and a right plate, which have a plurality of holes and lean against each other, leaving a V-shaped longitudinal groove open to said bottom side in between, and
   a plurality of transverse ridges, each transverse ridge having two ends connected with said border and comprising a front plate and a rear plate, which have a plurality of holes and lean against each other, leaving a V-shaped transverse groove open to said bottom side in between, such that said form grid is divided into a plurality of fields, which are relatively wide at said top side and relatively narrow at said bottom side;
   a gauze cloth; and
   a top plate;
   wherein, for producing tofu, said frame is placed on said bottom plate, said bottom side of said form grid is placed on said bottom plate, said form grid thereby being used as a lower form grid, said gauze cloth is laid from said top side on said form grid, covering said fields, tofu raw material is poured into said fields, said top plate is laid on said tofu raw material, and pressure is applied on said top plate, such that liquid flows out uniformly from said tofu raw material.

2. A form system for tofu production according to claim 1, wherein said form grid is placed upside down on said tofu raw material, being used as an upper form grid.

3. A form system for tofu production according to claim 1, wherein two of said form grids are used as said lower form grid and as said upper form grid.

4. A form system for tofu production according to claim 1, wherein said border of said form grid has an outward extending flange.

5. A form system for tofu production according to claim 4, wherein said flange has a plurality of holes.

* * * * *